US008656163B2

(12) United States Patent
Villegas et al.

(10) Patent No.: US 8,656,163 B2
(45) Date of Patent: Feb. 18, 2014

(54) METHOD FOR ESTABLISHING A SECURED COMMUNICATION WITHOUT PRELIMINARY INFORMATION SHARE

(75) Inventors: Karine Villegas, Gemenos (FR); Aline Gouget, Paris (FR); Louis Goubin, Paris (FR); Pascal Paillier, Paris (FR)

(73) Assignee: Gemalto SA, Meudon (FR)

( * ) Notice: Subject to any disclaimer, the term of this patent is extended or adjusted under 35 U.S.C. 154(b) by 131 days.

(21) Appl. No.: 13/145,724

(22) PCT Filed: Jan. 26, 2010

(86) PCT No.: PCT/EP2010/050827
§ 371 (c)(1),
(2), (4) Date: Jul. 21, 2011

(87) PCT Pub. No.: WO2010/084198
PCT Pub. Date: Jul. 29, 2010

(65) Prior Publication Data
US 2011/0283107 A1    Nov. 17, 2011

(30) Foreign Application Priority Data
Jan. 26, 2009    (EP) ..................................... 09305069

(51) Int. Cl.
*H04L 9/32*    (2006.01)

(52) U.S. Cl.
USPC ........... 713/168; 713/171; 713/165; 713/160; 713/166; 380/277; 380/260

(58) Field of Classification Search
USPC .................... 713/193, 170, 167–168; 726/24; 380/277, 270
See application file for complete search history.

(56) References Cited

U.S. PATENT DOCUMENTS

| | | | |
|---|---|---|---|
| 6,769,060 B1 | 7/2004 | Dent et al. | |
| 7,110,546 B2 * | 9/2006 | Staring | 380/260 |
| 7,328,342 B2 * | 2/2008 | Albanese et al. | 713/170 |
| 7,362,868 B2 * | 4/2008 | Madoukh et al. | 380/277 |
| 7,464,267 B2 * | 12/2008 | Zhu et al. | 713/168 |
| 7,620,186 B2 * | 11/2009 | Sozzani et al. | 380/277 |
| 7,724,905 B2 * | 5/2010 | Bleumer et al. | 380/277 |
| 7,822,986 B2 * | 10/2010 | Guillou | 380/277 |
| 8,180,709 B2 | 5/2012 | Oh et al. | |
| 8,522,028 B2 * | 8/2013 | Brique et al. | 713/171 |
| 2006/0155650 A1 | 7/2006 | Oh et al. | |
| 2009/0016527 A1 * | 1/2009 | Vigarie et al. | 380/259 |
| 2011/0274034 A1 * | 11/2011 | Rautiola et al. | 370/328 |

FOREIGN PATENT DOCUMENTS

| | | |
|---|---|---|
| JP | H 09-238132 (A) | 9/1997 |
| JP | 2005-138418 | 6/2005 |
| JP | 2008-527533 | 7/2008 |
| JP | 2008-209960 | 11/2008 |

OTHER PUBLICATIONS

S.M. Bellovin, Encrypted Key exchange, May 1992, IEEE, vol. 10, pp. 72-84.*
Menezes et al., "Handbook of Applied Cryptography", 1997, CRC Press LLC, USA, XP002535828, 8 pages.
International Search Report (PCT/ISA/210) issued on Mar. 23, 2010, by European Patent Office as the International Searching Authority for International Application No. PCT/EP2010/050827.
Written Opinion (PCT/ISA/237) issued on Mar. 23, 2010, by European Patent Office as the International Searching Authority for International Application No. PCT/EP2010/050827.
Korean Official Action received Mar. 11, 2013. Issued by the Korean Intellectual Property Office in the co-pending Korean Application No. 10-2011-7017494 and English Translation.
Japanese Official Action Mailed Feb. 5, 2013. Issued by the Patent Office of Japan in co-pending JP Application No. 2011-544894 and English Translation.
European Official Action Mailed Nov. 5, 2012. Issued by the European Patent Office in EP Application No. 10 701 666.9-1525.
Menezes, Vanstone, Oorschot: "Handbook of Applied Cryptography," 1997, *CRC Press LLC.* USA. XP 000863990.
Korean Notice of Preliminary Rejection. Mailed Jul. 30, 2012. Issued by the Korean Intellectual Property Office in KR Appln. No. 10-2011-7017494 and English Translation.

* cited by examiner

*Primary Examiner* — Nathan Flynn
*Assistant Examiner* — Viral Lakhia
(74) *Attorney, Agent, or Firm* — Buchanan Ingersoll & Rooney PC

(57) ABSTRACT

The invention relates to a method for generating a session key between two communicating electronic devices not requiring any prerecorded information in one of the two devices and enabling the authentication of one of said devices. The method uses a close collaboration between a symmetrical algorithm and an asymmetrical algorithm.

13 Claims, No Drawings

METHOD FOR ESTABLISHING A SECURED COMMUNICATION WITHOUT PRELIMINARY INFORMATION SHARE

The invention concerns a method for establishing a secured communication without preliminary information share.

The invention relates in particular to generation and exchange of session keys, in addition to authentication.

The constant rise in the exchanges between a communicating electronic device is constantly increasing the need for security. This necessity is particularly present in the contactless communications field of the RFID type, meaning "Radio Frequency IDentification".

The existing solutions are generally based on the joint knowledge of the secret among the various protagonists upstream from any communication. Although it is possible to ensure confidentiality of said shared information in some electronic devices, for example of the chip card type, it is however more complex to guarantee the same confidentiality in devices of the terminal, computer and reader type. The existing solutions therefore base their security on taking on board a security module in the devices devoid of same.

The present invention proposes a method for establishing secured communication and authentication not requiring joint knowledge of this kind.

In the present description, many references will be made to a specific asymmetrical algorithm known as "RSA for paranoid". This variant of the famous "Rivest Shamir Adleman" (RSA) algorithm, among other particularities, manipulates parameters p and q such that p is significantly smaller than q and the parameter n is always equal to the product (p.q). The size of p, noted in bits, is such that $|p|=$length_p.

The remainder of the operations are consistent with those performed in the so-called standard RSA.

The invention initially concerns a method for establishing secured communication between a first communicating electronic device known as the device and a second communicating electronic device known as the reader, each having at least one random number generator, a symmetrical encryption algorithm SYM, an asymmetrical encryption algorithm ASYM, a mathematical function F, wherein the device is associated with a cryptographic certificate Cert, a public key n and a private key Kpriv The method comprises at least the stages of:
engagement, during which the device generates a first random number k and informs the reader of the identity of the device
challenge, during which the reader obtains the public key n and subsequently generates a second random number r, encrypts it using the algorithm ASYM and n and transmits it to the device,
response, during which the device decrypts the random number r with the algorithm ASYM and the private key Kpriv, encrypts the random number k with the algorithm SYM and the random number r by way of a key, sends this encrypted data to the reader and generates a session key by applying the function F to the random numbers k and r
verification, during which the reader decrypts the random number k received with the algorithm SYM and the random number r by way of a key and subsequently generates a session key by applying the function F to the random numbers k and r.

In one embodiment, the key n may be recorded in said reader during a previous stage. In another embodiment, the reader may obtain the public key n from a third communicating electronic device.

In a specific embodiment, the method may furthermore comprise, on the part of the reader, a stage involving verification of the identity of the device during which the reader may obtain the certificate Cert and check its validity with the public key n by means of the algorithm ASYM. This certificate may be recorded in the reader during a previous stage, or be obtained from the electronic device during engagement, or be obtained from a third communicating electronic device.

In one embodiment, the algorithm ASYM and the public key may be the RSA, meaning "Rivest Shamir Adleman", or the "RSA for paranoid" or furthermore an algorithm based on the elliptical curves.

In one embodiment, the symmetric encryption algorithm may be the DES, meaning "Data Encryption Standard", or indeed the triple DES, or furthermore the AES, meaning "Advanced Encryption Standard".

Other characteristics and advantages of the invention will be clearly apparent from the description thereof given below, provided as an illustration and by no means limitative.

Let us analyse implementation within the specific context of contactless communications and specifically communications of the RFID type, between a contactless chip card and a contactless card reader in a transport application. The constraints associated with this specific context are in particular related to the duration of the transaction which must not exceed 150 msecs in order to comply with the philosophy of "tap and go". "Tap and go" is a principle which implies that a contactless transaction is effected by passing the card in front of the reader in a sweeping movement. The underlying concept is to avoid compelling the user to wait.

In order to meet this major constraint, the portion of the transaction devoted to establishing the secured communication must not exceed 70 msecs.

On the other hand, the extremely short duration of the transaction allows a less complex session key than in other uses. Indeed, a key intended for a session of 150 msecs and breakable within several minutes guarantees a good level of security in its nominal context of use.

Another constraint of this specific method of implementation is the reduction in cost of the readers by eliminating the security module which they contained until present. This elimination therefore renders impossible secured storage of the key capable of establishing a secured communication with a chip card.

Implementation of the present invention allows fulfilment of all these constraints, guaranteeing a high level of security.

The card contains a specific application of the asymmetrical algorithm known as "RSA for paranoid", generation of random numbers and application of the symmetrical algorithm DES, in addition to a paired private key (p, $d=e^{-1}$ mod (p-1))/public key (e,n) and a certificate of authenticity associated with this key pair.

The reader also contains an application of the symmetrical algorithm DES, a random number generator and an application of the asymmetrical algorithm known as "RSA for paranoid".

When the card enters into the sphere of action of the contactless reader, it initiates a stage known as the engagement stage during which the on-board random number generator produces a number k, the size in number of bits of which, noted length k, depends on the choice of symmetrical encryption algorithm used. The security parameter of the invention, which depends on the choice of symmetrical encryption algorithm, is the minimum between the size of the key and the size of the block. In the case in which the encryption algorithm used is the DES, this security parameter is the size of the key, resulting in length_k=56 bits.

The card will use k to produce what is termed engagement of k. This engagement involves use of the number k in a calculation in order to render any subsequent modification of the number k detectable. At this point in the algorithm, it is not desirable to transmit k in clear, or to be able to obtain the latter easily for security reasons. It is therefore strongly recommended to create an engagement that proves knowledge of k without disclosing the latter. An example of engagement of the number k may be its use as a key in encrypting a predetermined value using a symmetrical algorithm. In the embodiment described, the engagement consists of encrypting the zero value using the RSA algorithm and of the value k as the key.

The card transmits this engagement in addition to its public key (n) and its certificate of authenticity to the reader.

On receiving these data, the reader initiates a stage known as the challenge stage.

In one embodiment of the invention, the random number generator of the reader generates a value r. In order to enhance the security of the method, it is possible to associate a security value with the random number r. This value may be made up of several values.

In the embodiment described, the on-board random number generator will produce two random numbers u and r in order to form a number $z=t\|u\|r$, wherein t is a constant value or a value calculated based on u and r, such that the size of z is equal to the size of p in number of bits and $z<p$.

The security parameters of the invention that depend on the choice of the encryption algorithm RSA for paranoid are the size of the primary factor p noted length_p, the size of the RSA module n, noted length_n, the size of the random value $u\|r$, i.e. length_u+length_r and the size of t noted length_t. The sizes of the security parameters must necessarily verify the following inequalities: length k≤length u+length r≤length p.

The random number r is the same size as the number k generated by the card, i.e. $|r|=|k|=$length_k.

The random number u is of size (length_p length_t– length_k) in bits. The value of the length parameter t length_t bits is initialised at the value 0, or at another predetermined constant value, or alternatively, the value of t is a function of u and/or r.

The value z is encrypted by the reader with the known public parameter e, the public key n of the card and the primary—modular exponentiation—, required for the RSA. The result of this encryption is transmitted to the card.

On receiving these data, the card initiates the so-called response stage. It decrypts z using its private key (d, p) and the primary—modular exponentiation—, required for the RSA. It checks the correct format of z and identifies the security values in order to extract the random number r. In a simple embodiment, t may for example adopt the form of a series of zeros in order to ensure readily recognisable formatting. In a more advanced method however, t may for example contain data guaranteeing the integrity of the other data transmitted. For instance by means of chopping of these data.

From then on, the card encrypts the random number k obtained during the first stage of the method using the symmetrical algorithm DES and uses as the key the random number r obtained by decrypting the message z sent by the reader. This encrypted data is transmitted to the reader. The card calculates a session key Ksession by performing an exclusive or between values r and k.

Use of the exclusive or ensures consistency in the size of the session key. Any other mathematical operation taking account of values r and k may be used according to the invention. The reader subsequently enters the fourth and last phase of the method according to the invention, i.e. the so-called verification phase. During this phase, the reader decrypts the data received from the card using the symmetrical algorithm DES and the value r by way of a key. The reader thus obtains the value k.

From then on, it is in turn capable of generating the session key Ksession by performing an exclusive or between values r and k.

In this specific embodiment, it is likewise during this verification phase that the reader checks validity of the authenticity certificate using the public key n. This stage makes it possible to guarantee authenticity of the card.

Finally, according to the embodiment described, the reader also checks that the engagement provided by the card during the first stage is indeed valid, this engagement being the encrypted data of a predetermined constant with k as the key. This makes it possible to guarantee that the value of k is indeed that obtained during the engagement phase.

From then on, the two protagonists of the system, the card and the reader, share a common secret, Ksession and may therefore initiate a secured dialog.

It will be noticed that the choice of the algorithms and likewise the magnitude of the parameters studied are associated with the specific constraints of this embodiment. The present invention is perfectly suitable for use of any other symmetrical algorithm, for example triple DES, AES, etc., but also any other asymmetrical algorithm, along others all the algorithms based on elliptical curves.

In another embodiment, it is possible for the card not to simultaneously contain the certificate and the public key. For example, a set of predetermined authenticity certificates may be recorded in the reader. Hence, the reader will check during the verification phase that the public key which it has received at the engagement stage indeed corresponds to one of the stored certificates. Likewise, the opposite pattern is conceivable: a set of public keys may be pre-recorded in the reader. In this specific case, at the outset of the challenge stage, the reader is required to identify whether the certificate obtained at the engagement stage indeed corresponds to one of the recorded keys and use this key for the subsequent operations.

Finally, one may consider generating n such that the latter may be regenerated based on its low-significance bits and a pseudo generator of hazards—known to the card and the reader, PRNG(SN). One obtains in this case $n=PRNG(SN)\|n_L$ where $n_L$ represents the low-significance bits of n and SN, a serial number specific to the card. By taking the certificate of n of the type signature of n with message recovery, the card by sending SN concatenated to the certificate of n, provides the reader the elements necessary and adequate for calculation of n and verification.

It will be noted that the terms "card" or "device" used in the above description denote functions. Indeed, an application is perfectly conceivable in which a chip card implements the functionalities known as "reader" and w_ is a reader developing the functionalities known as "card".

This embodiment may for example be developed in a case in which the reader is equipped with a security module allowing the latter to accommodate cryptographic keys and perform security calculations. Furthermore, a card not possessing the necessary functionalities or of which the functionalities are not intended to be used. A preferred embodiment of the present invention involves each of the protagonists of the system implementing the two sets of functionalities. Consequently, the method described in the present invention may be conducted in parallel in both communication directions. We will speak in this particular case of a method of establishing cross-communication. Indeed, each of the methods employed repeats the stages of the invention; hence even if each of the protagonists possesses all the functionalities, during each method employed, one single protagonist (that which has the "card" functionality with regard to the method) utilises its respective certificate and cryptographic keys.

More dispersed solutions are also conceivable according to the invention, i.e. the certificate of authenticity or the public key may be available on a remote device, for instance a server. In this case, the reader must obtain from this remote device the supplementary data to that supplied by the card; if the card has provided a public key, the corresponding certificate must be obtained and if the card has supplied a certificate of authenticity, the reader must obtain the corresponding public key.

The invention claimed is:

1. A method for establishing secured communication between a first communicating electronic device and a second communicating electronic device that is a reader, each having at least one random number generator, a symmetrical encryption algorithm an asymmetrical encryption algorithm and a mathematical function, said first communicating electronic device being associated with a cryptographic certificate, a public key and a private key, the method comprising at least the stages of:

providing an engagement, during which said first communicating electronic device generates a first random number and informs said reader of the identity of said first communicating electronic device, providing a challenge, during which said reader obtains the public key and subsequently generates a second random number, encrypts it using said asymmetrical encryption algorithm and the public key and transmits it to said first communicating electronic device, providing a response, during which said first communicating electronic device decrypts the second random number with said asymmetrical encryption algorithm and said private key, encrypts said first random number with said symmetrical encryption algorithm and the second random number by way of a key, sends this encrypted data to said reader and generates a session key by applying said mathematical function to said first and second random numbers, and providing verification, during which said reader decrypts said first random number received with the symmetrical encryption algorithm and the second random number by way of a key and subsequently generates a session key by applying said mathematical function to said first and second random numbers.

2. The method according to claim 1, wherein at a previous stage, said public key is recorded in said reader.

3. The method according to claim 1, wherein said reader obtains said public key from a third communicating electronic device.

4. The method according to claim 1, further comprising, on the part of the reader, a stage involving verification of the identity of said first communicating electronic device during which said reader obtains said cryptographic certificate and checks its validity with said public key by means of the asymmetrical encryption algorithm.

5. The method according to claim 4, wherein at a previous stage, said cryptographic certificate is recorded in said reader.

6. The method according to claim 4, wherein said reader obtains said cryptographic certificate from said first communicating electronic device during the engagement.

7. The method according to claim 4, wherein said reader obtains said cryptographic certificate from a third communicating electronic device.

8. The method according to claim 1, wherein said asymmetrical encryption algorithm with a public key is a Rivest Shamir Adleman algorithm.

9. The method according to claim 1, wherein said asymmetrical encryption algorithm with a public key is the "RSA for paranoid" algorithm.

10. The method according to claim 1, wherein said asymmetrical encryption algorithm with a public key is based on the elliptical curves.

11. The method according to claim 1, wherein said symmetrical encryption algorithm is a Data Encryption Standard (DES) algorithm.

12. The method according to claim 1, wherein said symmetrical encryption algorithm is the triple DES algorithm.

13. The method according to claim 1, wherein said symmetrical encryption algorithm is an Advanced Encryption Standard (AES) algorithm.

\* \* \* \* \*